(12) United States Patent
Hasegawa et al.

(10) Patent No.: US 7,519,457 B2
(45) Date of Patent: Apr. 14, 2009

(54) PATH GENERATOR FOR MOBILE OBJECT

(75) Inventors: Yuji Hasegawa, Saitama (JP); Kentarou Yamada, Saitama (JP)

(73) Assignee: Honda Motor Company, Ltd., Tokyo (JP)

( * ) Notice: Subject to any disclaimer, the term of this patent is extended or adjusted under 35 U.S.C. 154(b) by 262 days.

(21) Appl. No.: 11/452,270

(22) Filed: Jun. 14, 2006

(65) Prior Publication Data

US 2006/0293792 A1    Dec. 28, 2006

(30) Foreign Application Priority Data

Jun. 17, 2005    (JP)    ............................. 2005-177449

(51) Int. Cl.
    *G06F 19/00*    (2006.01)
(52) U.S. Cl. ...................... 701/23; 340/435; 340/572.1; 340/825.49; 700/251; 180/167
(58) Field of Classification Search .................. 701/23; 340/572.1, 539.13, 435; 700/245, 251, 255, 700/253; 180/167; G06F 19/00
    See application file for complete search history.

(56) References Cited

U.S. PATENT DOCUMENTS

| | | | | |
|---|---|---|---|---|
| 6,331,116 | B1* | 12/2001 | Kaufman et al. | 434/262 |
| 6,363,300 | B1* | 3/2002 | Inga | 700/245 |
| 6,917,855 | B2* | 7/2005 | Gonzalez-Banos et al. | 700/245 |
| 7,180,253 | B2* | 2/2007 | Weinhofer et al. | 318/34 |
| 7,317,973 | B2* | 1/2008 | Dieterle | 701/23 |
| 7,386,163 | B2* | 6/2008 | Sabe et al. | 382/153 |
| 2002/0183922 | A1* | 12/2002 | Tomasi et al. | 701/202 |
| 2005/0104736 | A1* | 5/2005 | Gudat | 340/686.6 |
| 2005/0137748 | A1* | 6/2005 | Kim | 700/245 |
| 2005/0197752 | A1* | 9/2005 | Yang et al. | 701/23 |
| 2005/0216124 | A1* | 9/2005 | Suzuki | 700/253 |

OTHER PUBLICATIONS

Khatib, Oussama, "*Real-Time Obstacle Avoidance for Manipulators and Mobile Robots*", International Journal of Robotics Research, vol. 5, No. 1, Spring 1986, pp. 90-98.
Rimon, Elon et al., "*Exact Robot Navigation Using Artificial Potential Functions*", IEEE vol. 8, No. 5, Oct. 1992, pp. pp. 501-518.

* cited by examiner

*Primary Examiner*—Tuan C To
(74) *Attorney, Agent, or Firm*—Squire, Sanders & Dempsey L.L.P.

(57) ABSTRACT

A path generator includes a map generator for generating a map for a movement space based on information on the position and shape of a mobile object, an obstacle, and a target object. It also includes a composite potential generator for calculating an attractive potential and a repulsive potential based on relative positional relationship among the mobile object, the obstacle, and the destination position, and generating a composite potential that is a sum of the attractive potential and the repulsive potential. A local minimum determination unit performs a path search in the map based on the composite potential and determines whether a convergence position of the path search is a local minimum. If it is, a phantom potential generator generates a phantom potential to be added to the potential of the convergence position. If the convergence position is the destination position, a path generator generates a movement path for the mobile object based on the result of the path search.

8 Claims, 7 Drawing Sheets

FIG.3
(a)
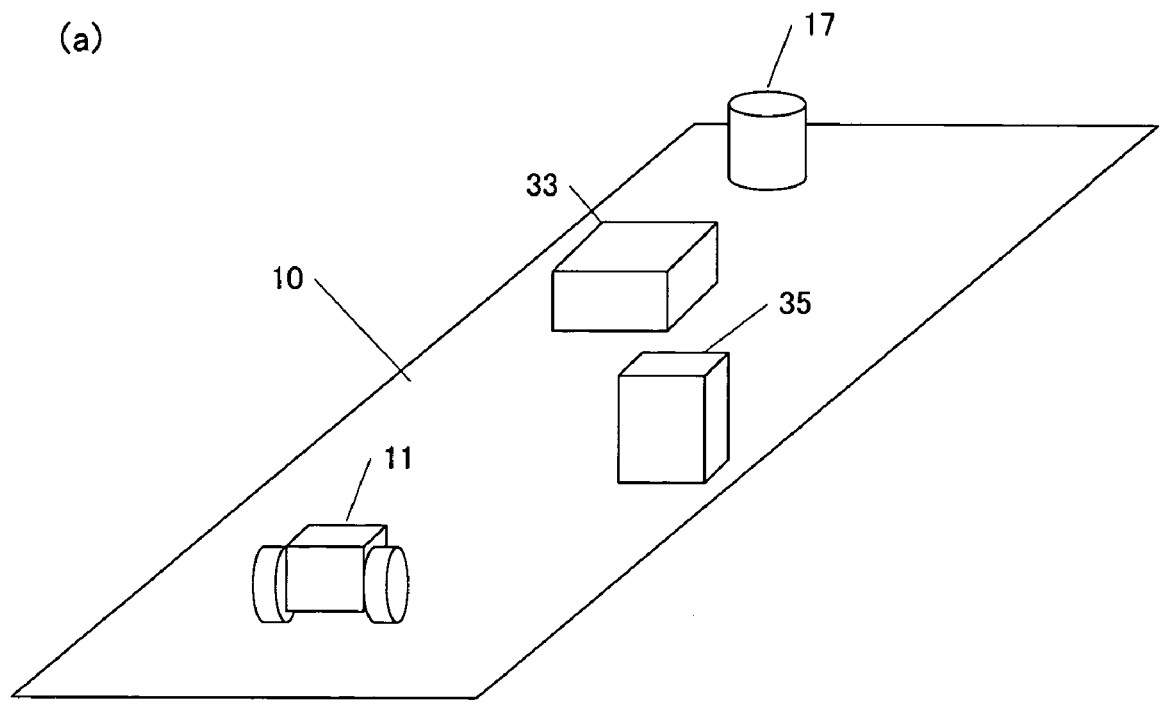
(b)
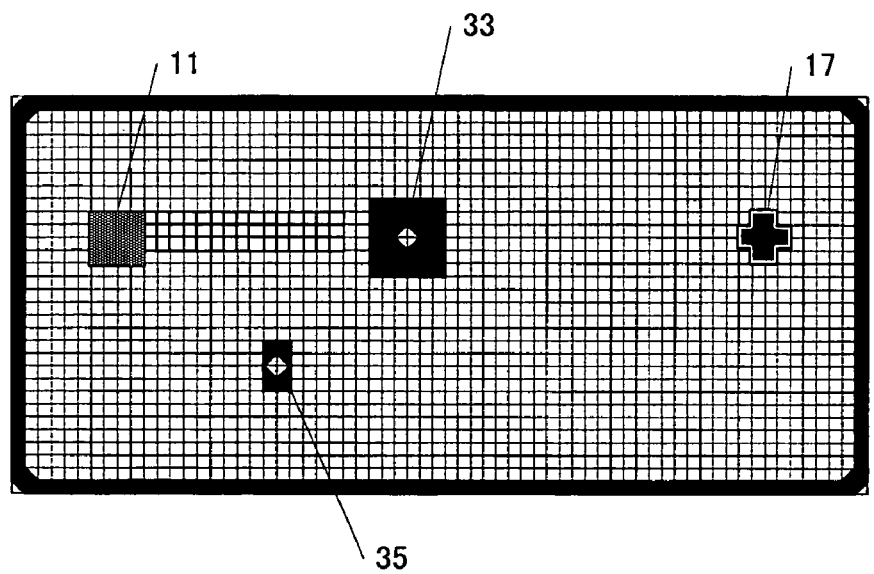

FIG.4
(a) 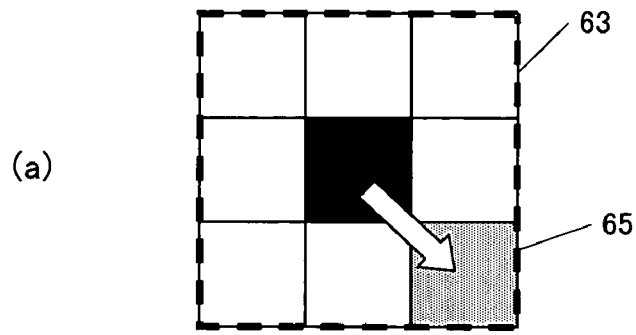
(b) 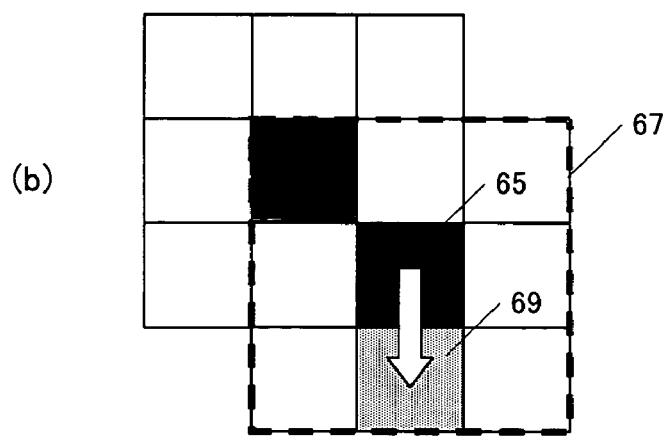
(c) 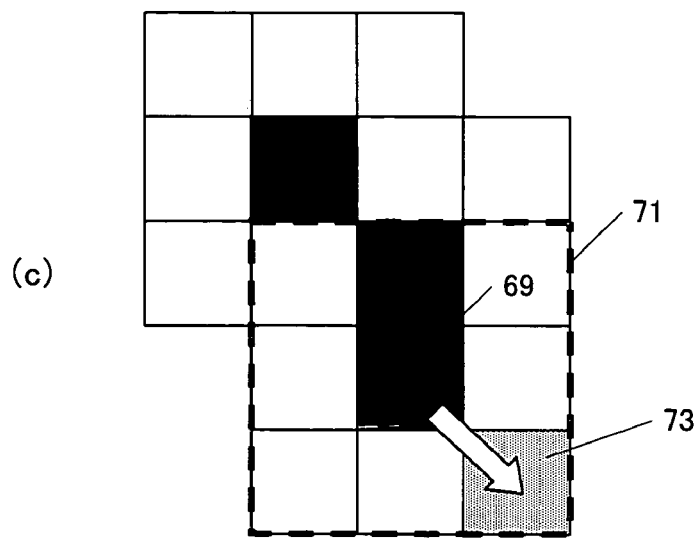

FIG.5
(a) 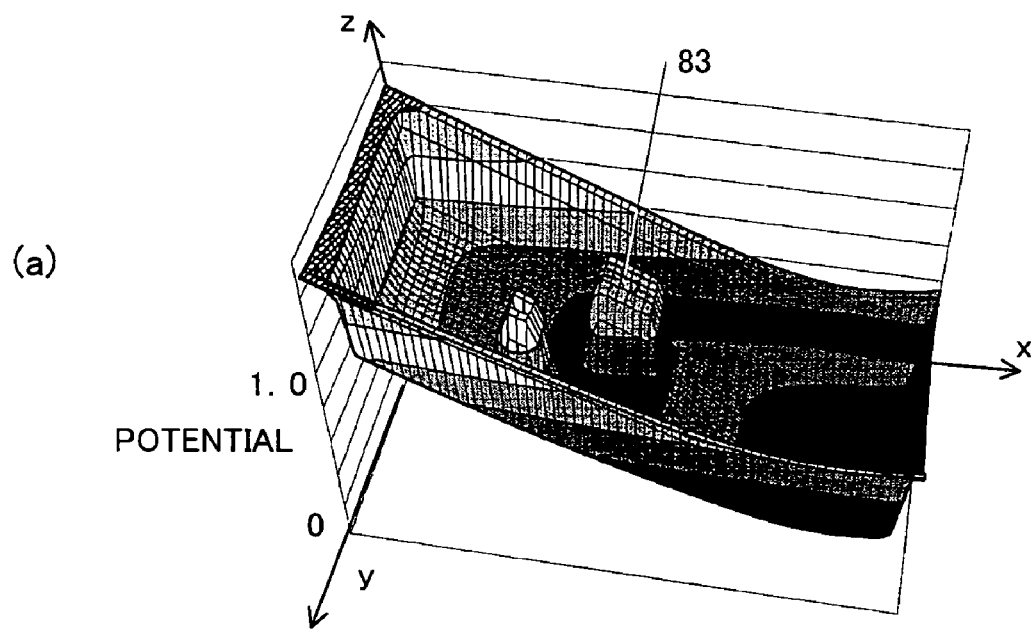
(b) 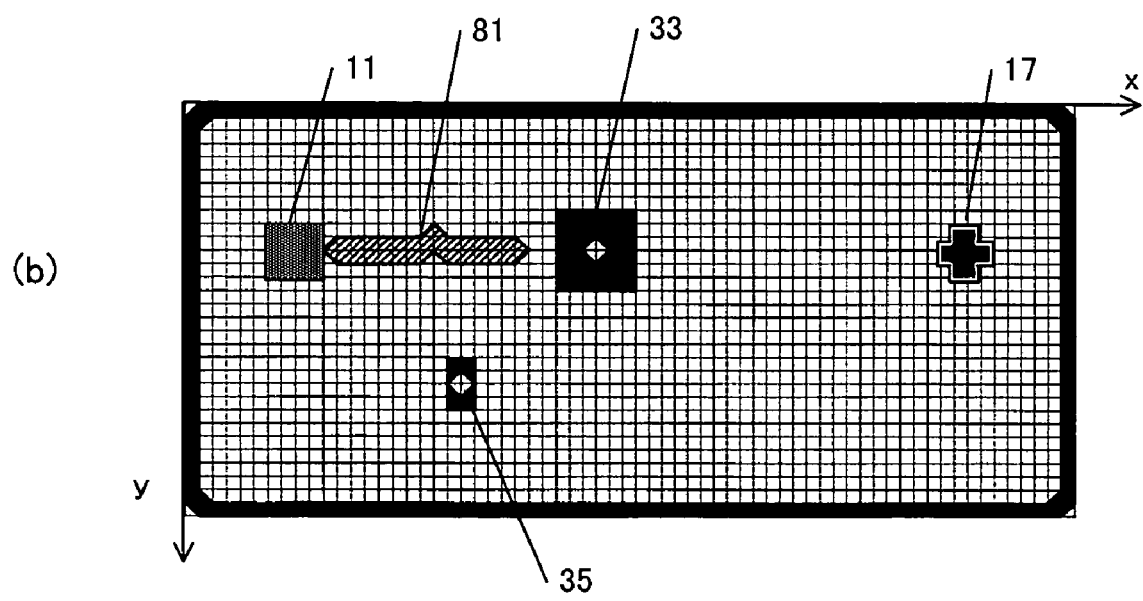

FIG.6
(a) 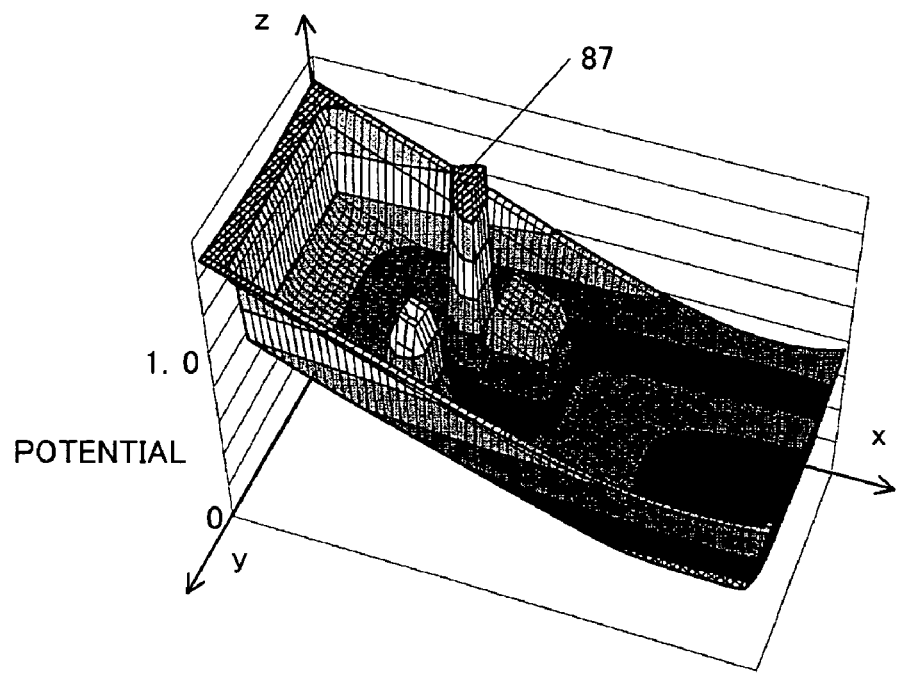
(b) 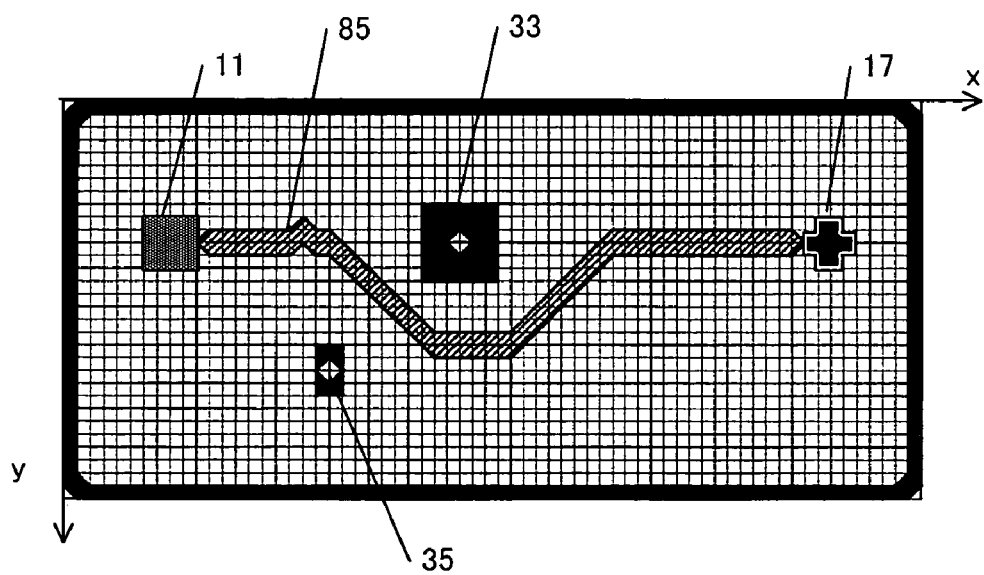

PATH GENERATOR FOR MOBILE OBJECT

BACKGROUND OF THE INVENTION

1. Field of the Invention

The present invention relates to an apparatus for automatically generating a movement path for a mobile object. More particularly, the present invention relates to a path generator utilizing artificial potential based on positional relationship among objects in an object space and determination of a local minimum.

2. Description of the Related Art

One of known techniques for mobile object navigation is the artificial potential method as is describes in Non-patent Document 1. This method forms a potential field in an object space in which navigation is to be performed and determines an overall path to a destination point based on the gradient of the potential field. A movement path is generated by repeating a search for a minimum potential point in the vicinity of the current position. The artificial potential method is superior to other conventional techniques such as graph search in that it can automatically and flexibly generate a path in an object space.

However, in the artificial potential method, in principle, a search for a movement path may converge to a local minimum halfway and a movement path to the ultimate destination point may not be generated for certain structures of potential field of the object space in which navigation is performed.

In order to avoid such a local minimum problem, a path planning method utilizing Laplace potential is also known as can be seen in Non-patent Document 2. The Laplace potential method sets a plurality of cells for calculating potentials as a grid in an object space in which navigation is performed, and performs a calculation using the Laplace differential equation for each of the cells.

However, in the Laplace potential method, there will be a single minimum point in an entire potential field and calculation needs be repeated until the minimum point corresponds with the destination point. Thus, calculation takes a significantly long time depending on the structure of the object space. Thus, rapid path planning, guidance of a mobile object, and change of a path can hardly be performed.

References

Non-patent Document 1: O. Khatib, "Real-Time Obstacle Avoidance for manipulators and Mobile Robots", International Journal of Robotics Research, 51, pp. 90-98, 1986

Non-patent Document 2: E. Rimon, D. E. Koditscheck, "Exact Robot Navigation using Artificial Potential Functions", IEEE Transactions Robotic and Automation, Vol. 8, No. 5, pp. 501-518, 1992

It is an object of the invention to provide a path generator that avoids the local minimum problem inherent to the artificial potential method and realizes rapid path planning.

SUMMARY OF THE INVENTION

The present invention provides a path generator for autonomously generating a movement path for a mobile object within a movement space. The apparatus comprises a map generator for generating a map for a movement space based on information including the initial position and the destination position of the mobile object and the position and shape of an obstacle. The apparatus also includes a composite potential generator for calculating using a map an attractive potential and a repulsive potential that are based on relative positional relationship among the mobile object, the obstacle, and the destination position. The composite potential generator generates a composite potential that is the sum of the attractive potential and the repulsive potential.

The apparatus further includes a local minimum determination unit for performing a path search in the map based on the composite potential to determine whether a convergence position of the path search is a local minimum that is not the destination position. The apparatus includes a phantom potential generator for, if it is determined that the convergence position is a local minimum, generating a phantom potential that is obtained by increasing the potential of the convergence position by a predetermined value. The apparatus also includes a path generator for, if it is determined that the convergence position is not a local minimum but the destination position, generating a movement path for the mobile object based on the result of the path search. The phantom potential generated by the phantom potential generator is added to the composite potential.

According to the invention, the local minimum problem can be avoided, and a search can be performed only with comparison operations on a local area so that a rapid path search is possible.

In an embodiment of the invention, the path generator further comprises a tag information detector for identifying information on the position and shape of the mobile object, obstacles and a target object at the destination position based on signals from tags attached to them.

In an embodiment of the invention, the tag can be an RF-ID tag that is applied to the target object and movable obstacles and can be an ultrasonic tag that is applied to the mobile object and stable obstacles.

The invention further provides a program for autonomously generating a movement path for a mobile object in a movement space. The program is stored in a memory and causes a computer to perform a function of generating a map for a movement space based on information including the initial position and the destination position of the mobile object and the position and shape of an obstacle. The program also performs the function of calculating, based on the map, an attractive potential and a repulsive potential that are based on relative positional relationship among the mobile object, the obstacles, and the destination position, and of generating a composite potential that is the sum of the attractive potential and the repulsive potential. The program performs a path search in the map based on the composite potential and determines whether a convergence position of the path search is a local minimum, not the destination position. The program performs a function of, if it is determined that the convergence position is a local minimum, generating a phantom potential that is obtained by increasing the potential of the convergence position by a predetermined value, and adds the phantom potential to the composite potential. The program also performs a function of if it is determined that the convergence position is not a local minimum but the destination position, generating a movement path for the mobile object based on the result of the path search.

In an embodiment of the invention, the program further comprises a function of identifying information including the initial position and the destination position of the mobile object and the position and shape of the obstacle from signals sent from tags that are attached to the mobile object, the obstacle, and a target object at the destination position.

Unlike the Laplace potential method that has been proposed for solving the local minimum problem associated with the conventional artificial potential method, the present invention does not require to calculate the Laplace equation and have it converge in all cells that are set in a search space. According to the apparatus or the program of the invention, a rapid search for a movement path can be done because the calculation converges by repetition of comparison operations only on a limited search region (eight points neighboring the current position).

BRIEF DESCRIPTION OF THE DRAWINGS

FIG. 3 illustrates a perspective view showing an example of a movement space in which obstacles exist on the path to a destination object and a corresponding object map.

FIG. 4 illustrates a process of movement path search.

FIG. 5 illustrates a potential field and a movement path generated by the artificial potential method.

FIG. 6 illustrates a potential field and a movement path generated by the movement path generation method according to an embodiment of the invention.

DETAILED DESCRIPTION OF THE PREFERRED EMBODIMENTS

Figure 1:
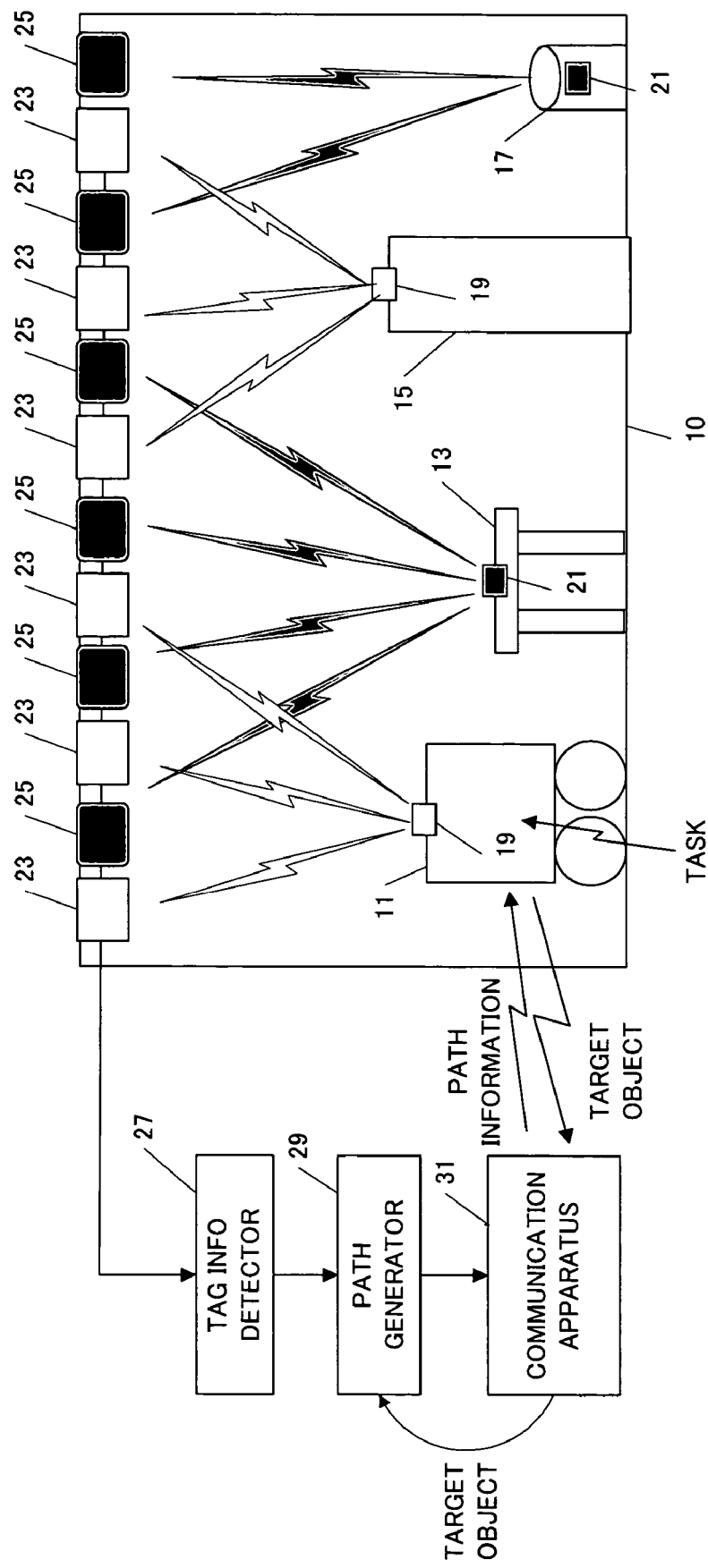
FIG. 1 is a schematic diagram showing the navigation system for a mobile robot that includes a path generator according to an embodiment of the invention.

An embodiment of the invention will be now described with reference to drawings. FIG. 1 is a schematic diagram illustrating a navigation system for a mobile robot 11 that includes a path generator 29 according to an embodiment of the invention.

The system generates an optimal movement path that allows the mobile robot 11 to reach a target object 17 guiding the mobile robot 11 in a movement space 10 such as an interior of a house. Obstacles that block the progress of the mobile robot 11 exist between the mobile robot 11 and the target object 17. There are two types of the target object 17 and the obstacles, one being a movable obstacle 13 such as a chair and a glass whose position is frequently changed in daily life, and the other being a fixed obstacle 15 such as a chest of drawers and a cupboard which is not usually moved.

Here, the target object 17 and obstacles are relative expressions. When a task such as movement to a certain object or an operation to the object is given to the mobile robot 11, the object is recognized as the target object 17. As well, any object in the movement space 10 that obstructs the movement or operation of the mobile robot 11 is recognized as the obstacles 13 and 15.

The mobile robot 11 has movement means such as bipedal walking device or wheel running device, capable of autonomous movement. The mobile robot 11 is connected to a communication apparatus 31 via a wireless LAN and moves in the movement space 10 according to information on a movement path received from the communication apparatus 31.

Tags 19 and 21 are attached to all objects placed in the movement space 10 (including movable obstacle 13, fixed obstacle 15, mobile robot 11, and target object 17) for providing/recognizing information on the object such as the type, shape and weight of the object through IDs. The tags 19 and 21 are an ultrasonic tag and an RF-ID tag, respectively, either of which may be used according to the type of object.

The ultrasonic tag 19 allows calculation of the third-dimensional position of the tag using ultrasonic waves emitted from the tag with high precision (on the order of centimeters). Since the ultrasonic tag 19 actively emits ultrasonic waves from itself it need to have a power supply or requires an environment that can connect it to an external power supply. The ultrasonic tag 19 is relatively large in size. For those reasons, the ultrasonic tag 19 is applied to the fixed obstacle 15 that can be connected to an external power supply and the mobile robot 11 that has a self power supply and requires highly precise detection of its position for the purpose of path following. An ultrasonic tag system uses a frequency band above 20 kHz (e.g., about 40 kHz). The frequency band to be used is selected as appropriate in accordance with a communication environment and the like so that positions can be detected satisfactorily.

The RF-ID tag 21 is a passive tag that is activated by radio wave received from an RF-ID antenna 25 attached on the ceiling. Tag 21 returns its ID information to the antenna 25. The RF-ID tag 21 can be implemented as a much smaller device than the ultrasonic tag 19 because it does not require a power supply, and thus is superior in terms of convenience. Tag 21 can not provide position detection as precise as an ultrasonic tag system due to the nature of the systems. The RF-ID tags 21 are attached to the movable obstacles 13 and the target object 17 which may have limited areas for attaching the tag and may not be connected to a power supply. Frequency bands used for the RF-ID tag system may include 13.56 MHz, 950 MHz, and 2.45 GHz, for example.

Ultrasonic wave is superior with respect to rectilinear movement in general, but has an occlusion problem, that is, communication deteriorates when an obstacle exists in-between. The RF-ID system is superior in coping with the occlusion problem. Thus, whether the ultrasonic tag 19 or the RF-ID tag 21 is used as a tag is a matter of choice depending on the availability of a power supply, frequency of movement, or usage position. Where and how many tags are attached is determined in consideration of the size or shape of an object, communication quality at each position and so on. For example, for a cupboard placed close to a wall, the ultrasonic tags 19 may be attached at its four corners apart from the wall so that an obstacle area can be recognized when the mobile robot 11 passes by the cupboard.

On the ceiling of the movement space 10, ultrasonic receivers 23 for receiving radio wave from the ultrasonic tags 19 and RF-ID antennas 25 for receiving radio wave from the RF-ID tags are provided in the form of a grid. The spacing between them is determined according to the size and shape of the movement space 10, the coverage area of the ultrasonic and RD-ID tag systems, and the number of objects in the movement space 10 and the like, so that position detection and path generation can be performed efficiently and without omission. In this embodiment, the ultrasonic receivers 23 and the RF-ID antennas 25 are alternately positioned in the form of a grid with 50 cm spacing.

Since radio wave emitted by the tags 19 and 21 may be weak or directional, a signal from a certain one of the tags 19 and 21 cannot be detected by all of the ultrasonic receivers 23 or the RF-ID antennas 25 attached to the ceiling. Signal from the tag 19 or 21 is received by the ultrasonic receiver 23 or the RF-ID antenna 25 in the vicinity of the tag 19 or 21, and the position of the object on which the tag 19 or 21 is attached is determined based on the positional relationship with the ultrasonic receiver 23 or the RF-ID antenna 25. As methods of determining an object position in an ultrasonic and RF-ID tag systems are known and are not essential to the invention, detailed description is omitted.

A tag information detector 27 receives a tag signal detected by the ultrasonic receiver 23 and the RF-ID antenna 25, determines the position of the tag 19, 21 from how the tag signal was received, and reads out object-specific information such as the type and shape of the object in question from ID information contained in the tag signal. A path generator 29 to be described hereafter includes a tag database 45 for storing object-specific information based on the position information and the ID of the tag 19, 21. Such information may be passed to a map generator 41 as necessary.

The path generator 29 of the present invention, upon receipt of object specific information based on the position information and the ID of the tag 19, 21 in the movement space 10, generates an optimal path that allows the mobile robot 11 to avoid the obstacles 13 and 15 and reach the target position where the target object 17 exists. Here, the path generator 29 is triggered when a certain task is given to the mobile robot 11 and starts to search an optimal path to the target position.

For example, if a task of moving to the target object 17 is given to the mobile robot 11, the mobile robot 11 extracts tag ID information relative to the target object 17 from the task command, and passes the tag ID information to the path generator 29 via the communication apparatus 31. Upon receiving the tag ID information from the robot 11, the path generator 29 searches for and determines an optimal path for the mobile robot 11 based on the tag information for each object obtained from the tag information detector 27. When the path determined by the path generator 29 is communicated to the mobile robot 11 via the communication apparatus 31, the mobile robot 11 travels to the position of the target object 17 along the path utilizing the ultrasonic tag system and its own vision system.

Although tag ID information for the target object 17 is contained in a task command in this embodiment, such tag ID information may be supplied to the mobile robot 11 in a different manner. For example, tag ID information for the target object 17 may be obtained by the robot 11 when a user specifies the target object 17 utilizing a touch panel and the like and/or providing the characteristics (e.g., color, shape, name) of the target object 17 to the robot 11 by voice and causing the robot 11 to find an appropriate object having those characteristics from a database.

The present invention adopts a method that is an improvement of the conventional artificial potential method as the path searching method. Detail on it will be described below.

The communication apparatus 31 sends information on the optimal movement path generated by the path generator 29 to the mobile robot 11. The information may be sent over a wireless LAN, for example. The mobile robot 11 travels to the target position in accordance with the received path information.

The tag information detector 27, path generator 29, and communication apparatus 31 can be implemented by hardware. The functions of the tag information detector 27 and path generator 29 may be implemented by a software program. The tag information detector 27 and the communication apparatus 31 may be included in the path generator 29. Also, at least either of the tag information detector 27 and the path generator 29 may be integrated into the mobile robot 11.

Figure 2:
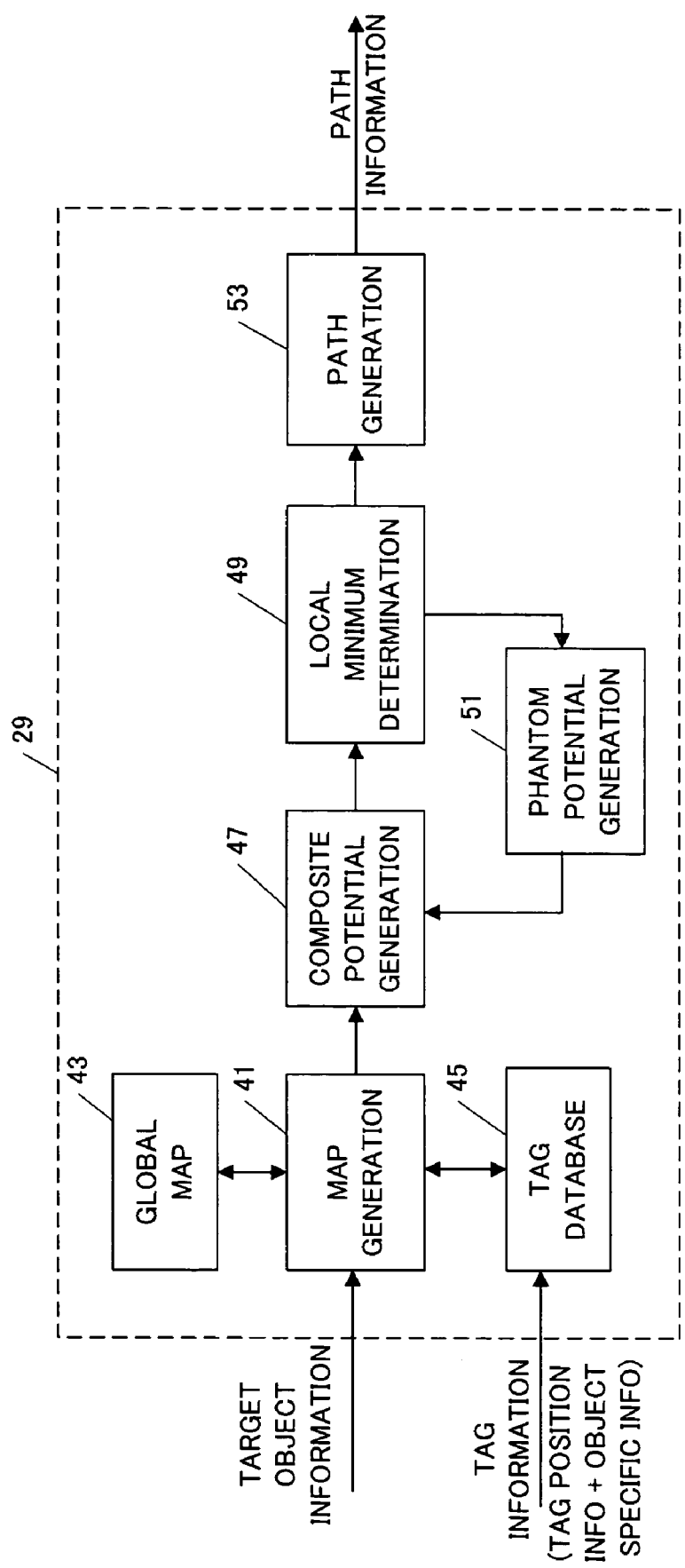
FIG. 2 is a functional block diagram illustrating the configuration of the path generator according to the embodiment of the invention.

Referring to FIG. 2, the technique for searching for an optimal path for the mobile robot 11 performed by the path generator 29, which constitutes the invention, will be described. FIG. 2 is a functional block diagram illustrating the configuration of the path generator 29 according to the embodiment.

A map generator 41 generates an object map for the movement space 10 by utilizing tag information (object specific information based on position information and a tag ID) for objects within the movement space 10 (i.e., the mobile robot 11, target object 17, movable obstacle 13 and fixed obstacle 15) determined by the tag information detector 27. An object map is a map that represents presence status of respective objects in the movement space 10 as a grid by two-dimensionally projecting the objects onto the map. The spacing of the grid on the object map is set in accordance with the height of the ceiling of the movement space 10 that affects the precision of position detection of the RF-ID tag 21, complexity of the objects in the movement space 10, communication capability of the ultrasonic tag system and the RF-ID tag system, moving speed and operation control precision of the mobile robot 11, computation ability of the path generator 29 and the like. The spacing may be 50 centimeters in this embodiment.

For example, assume a movement space 10 in which two obstacles 33 and 35 (the movable obstacle 13 or the fixed obstacle 15) exist between the mobile robot 11 and the target object 17 as shown in FIG. 3(A). The map generator 41 first receives information on the movement space 10 from a global map 43 and sets the size of the object map. The map 43 includes information such as size and shape of the movement space 10, positions of walls, positions of doorways and the like.

Then, the map generator 41 determines the positions of respective objects in the movement space 10 on the object map based on tag position information stored in a tag database 45. Further, the generator 41 reads out from the tag database 45 information specific to the object (shape and type) based on tag IDs, and plots a shape corresponding to the object specific information on the object map as an object area.

FIG. 3(B) illustrates an example of the object map. Shaded areas in the object map represent areas in which existence of an object (the mobile robot 11, target object 17, and obstacles 33 and 35) is recognized. As shown in FIG. 3(B), an object map consists of a plurality of small rectangular areas (cells) arranged in the form of a grid. The area occupied by an object (referred to as an object area) is identified in terms of the cells. For example, if the obstacle 33 occupies a portion of a cell, the cell in its entirety is identified as a part of the area occupied by the obstacle 33. This avoids a problem of the mobile robot 11 colliding with the obstacle 33 while it travels.

The object map may be designed such that the range of an object area includes a certain margin outward from the actual object area. In that case, a sufficient distance from an object is secured so that it is ensured that a collision while mobile robot 11 moves is avoided. The width of the margin may be determined in consideration of the number and shape of objects in the movement space 10, movement behavior of the mobile robot 11 and the like.

The map generator 41 gives cell values to all cells that constitute a two-dimensional object map to complete the object map. Here, areas where the obstacles 33 and 35 of FIG. 3(B) lie are given the cell values of "1" and other areas are given the cell values of "0". The cell value is utilized as an index for determining whether an area is an object area or not when a potential field to be discussed later is calculated.

Information in the database 45 of FIG. 2 is sequentially updated at a certain interval (e.g., every 10 ms).

The global map 43 and the tag database 45 in FIG. 2 may be provided external to the path generator 29 of the present embodiment. Information in the global map 43 and the tag database 45 may be supplied to the map generator 41 externally.

Returning to FIG. 2, a composite potential generator 47 calculates a composite potential U(x,y) based on the object map of the movement space 10 generated by the map generator 41 and generates a potential field for the entire movement space 10. The composite potential U(x,y) is obtained by adding a phantom potential $U_v(x,y)$ to a repulsive potential $U_0(x,y)$ and an attractive potential $U_{xd}(x,y)$ which have been used in the conventional artificial potential method. The phantom potential is prepared to avoid a local minimum. The process of preparing the phantom potential $U_v(x,y)$ will be described hereafter.

The repulsive potential $U_0(x,y)$ is a potential preventing the mobile robot 11 from approaching the obstacles 13, 15. The value of the repulsive potential $U_0(x,y)$ is "0" when the distance between the coordinate (x,y) of a certain cell and the obstacle 13, 15 on the object map is greater than a predetermined value ($p_0$). The value of the repulsive potential $U_0(x,y)$ increases as the coordinate (x,y) is closer to the obstacle 13, 15. That is, the repulsive potential $U_0(x,y)$ forms a potential field that contributes to move away the path from the obstacle. The repulsive potential $U_0(x,y)$ is calculated for each obstacle by the following formula:

$$U_0(x,y) = \begin{cases} \frac{1}{2}\eta\left(\frac{1}{p(x,y)} - \frac{1}{p_0}\right)^2 & p(x,y) \le p_0 \\ 0 & p(x,y) > p_0 \end{cases} \quad (1)$$

Here, η is a positive weighting constant. $p_0$ is a positive constant and is a threshold value at which the repulsive potential $U_0(x,y)$ is produced.

Here, $p_0$ is a value that determines to what distance the repulsive potential $U_0(x,y)$ needs be calculated. The constant η is a value for adjusting the magnitude of the repulsive potential $U_0(x,y)$. The constant $p_0$ and the constant η are determined based on the number of objects in the movement space 10, the computation ability of the path generator 29, a desired time period to the convergence of repulsive potential calculation and the like. Although it depends on the precision of the self-position detection of the mobile robot 11, when the constant η is large, the mobile robot 11 is less likely to collide with an obstacle during its movement, and when the constant η is small, the mobile robot 11 can pass through a narrow space.

p(x,y) in Formula (1) represents the smallest distance from a coordinate (x,y) of a cell on the object map to the cells where an obstacle lies, and is calculated by the following formula:

$$p(x,y) = \min\sqrt{(x-x_m)^2 + (y-y_m)^2} \quad (2)$$

The coordinate $(x_m, y_m)$ represent coordinates of all cells where the obstacle of interest lies. The area of the obstacle in question is determined based on the cell value given to the object map. Specifically, a set of cell areas having cell value of "1" is treated as an area where the obstacle lies. The coordinates of all the cells contained in the set are denoted as $(x_m, y_m)$.

The attractive potential $U_{xd}(x,y)$ is a potential that moves the mobile robot 11 toward the target position $(x_d, y_d)$ where the target object 17 lies. The value of an attractive potential $U_{xd}(x,y)$ is "0" at the target position $(x_d, y_d)$ and increases as the coordinate (x,y) on the object map is farther from the target position $(x_d, y_d)$. Specifically, the attractive potential $U_{xd}(x,y)$ is calculated by the following formula:

$$U_{xd}(x,y) = \frac{1}{2}k_p\{(x-x_d)^2 + (y-y_d)^2\} \quad (3)$$

Here, $(x_d, y_d)$ is the coordinates of the target object 17. $k_p$ is a positive weighting factor. $k_p$ can be determined such that the attractive potential $U_{xd}(x,y)$ for the initial position of the mobile robot 11 prior to its movement is "1", for example.

A phantom potential $U_v(x,y)$ is added to the attractive potential $U_{xd}(x,y)$ and the repulsive potential $U_0(x,y)$ to generate a composite potential U(x,y). The initial value of the phantom potential $U_v(x,y)$ is 0.

$$U(x,y) = U_{xd}(x,y) + U_0(x,y) + U_v(x,y) \quad (4)$$

The composite potential U(x,y) forms a potential field for each cell as shown in FIG. 6(A) in the case of the movement space 10 shown in FIG. 3, for example.

The local minimum determination unit 49 performs a path search utilizing the potential field of the movement space 10 in terms of the composite potential U(x,y). It searches for minimum potential points in local areas moving from the starting point of navigation to the destination point based on the gradient of the potential field in order to establish an entire path.

Referring to FIG. 4(a), values of composite potentials U(x,y) of eight points 63 neighboring the cell 61 corresponding to the initial position of the mobile robot 11 are compared, and a cell 65 having the smallest value is selected. Cell 65 now becomes a reference cell. Turning to FIG. 4(b), values of composite potential U(x,y) of eight points 67 neighboring the cell 65 are compared, and cell 69 having the smallest value is selected. Then, cell 69 becomes a reference cell. Turning to FIG. 4(c), composite potential values of eight points 71 neighboring the cell 69 are compared, and cell 73 having the smallest values is selected, cell 73 becoming the next reference cell. By repeating these steps, a movement path is found as a sequence of the reference cells.

When all the composite potentials U(x,y) of the neighboring eight points are greater than the composite potential of the current position of the mobile robot 11, the path search process determines a convergence position $(x_g, y_g)$ is reached. Then, a check is made as to whether the convergence position $(x_g, y_g)$ is destination position $(x_d, y_d)$. If they do not match, the convergence position is a local minimum position. And, a phantom potential $U_v(x,y)$ for resolving the local minimum is generated. If the two positions match, the path to the target object 17 has been established. In reality, a convergence position and a destination position rarely match because of errors in position detection and the like. Thus, it is also possible to determine that the path to the destination position is completed when the distance between the convergence position and the destination position is smaller than a predetermined threshold value.

Returning to FIG. 2, the phantom potential generator 51 generates a phantom potential $U_v(x,y)$ which increases the local minimum potential of the cell $(x_g, y_g)$ to resolve the local minimum. The added value, the phantom potential $U_v(x,y)$ is determined based on the size of the operation space, the number of obstacles, a desired time by which a calculation is converged and so on. A simulation indicates that in the case the potential for the initial position of the mobile robot 11 is "1" and the potential for the destination position is "0" as in this embodiment, a phantom potential of 0.1 enables rapid and high-precision generation of a path.

The value of phantom potential $U_v(x,y)$ may be set based on the difference in potential between the initial position of the mobile robot 11 and its destination position, the number of cells, the computation ability of the system, the speed and precision of path generation desired by a user for the invention and so on. Also, in addition to the potential of a convergence position that is determined to be a local minimum, the potential of neighboring eight points may be simultaneously increased by a predetermined amount. The phantom potential $U_v(x,y)$ is input to the composite potential generator 47 described above and added to the composite potential $U(x,y)$. Then, a new potential field resolving the local minimum that has converged in the previous path search is formed and further path search is performed.

The path generator 29 according to the invention avoids a local minimum at a much lower calculation cost than the conventional artificial potential method by adding the phantom potential $U_v(x,y)$ described above to the potential field.

After path search at the local minimum determination unit 49 is completed, the path generator 53 generates information on a movement path from the initial position of the mobile robot 11 to the destination position $(x_d, y_d)$ and sends the information to the communication apparatus 31.

With reference to FIGS. 5 and 6, the movement path generation method of the invention is compared to the conventional artificial method. The illustrated movement space 10 is the same as that shown in FIG. 3.

FIG. 5(a) shows a potential field that is generated by the conventional artificial potential method. FIG. 5(b) shows a result of movement path search 81 on an object map that is based on the potential field generated by the conventional artificial potential method. The x- and y-axes in FIG. 5(a) correspond to the x- and y-axes in FIG. 5(b), and z-axis represents the value of potential for each cell in the object map. With reference to FIG. 5(a), it can be seen that in the artificial potential method a potential field inclines from the initial position of the mobile robot 11 to the destination position 17 due to the effect of the attractive potential $U_{xd}(x,y)$. And a potential field that assumes a greater value as it is closer to the obstacles 33, 35 is formed due to the effect of the repulsive potential $U_0(x,y)$.

As can be seen from FIG. 5(b), the movement path 81 ends before the obstacle 33 and thus does not reach the destination position 17. With reference to the potential field of FIG. 5(a), a local minimum in the vicinity of the obstacle 33 caused by the effect of the potential field 83 of a large value corresponding to the obstacle 33, hinders movement in the direction of the target object 17. In other words, the path search has converged to a local minimum. Thus, the artificial potential method of prior art has a problem that path search converges to a local minimum due to the presence of obstacles and the like.

FIG. 6(a) illustrates a potential field that is generated by the movement path generation method according to the invention. FIG. 6(b) illustrates a result of a movement path search 85 shown on an object map. As in FIG. 5, the x- and y-axes in FIG. 6(a) correspond to the x- and y-axes in FIG. 6(b), and the z-axis represents the value of a potential for each cell on the object map. As can be seen from FIG. 6(a), according to the movement path generation method of the invention, the phantom potential generator 51 generates a potential field by increasing potential 87 of the cell that has been determined to be a local minimum. Referring to FIG. 6(b), the movement path 85 reaches the destination position 17 without converging to a local minimum because of the potential 87 that is increased by the phantom potential $U_v(x,y)$.

As has been described, the movement path generation method of the invention avoids a local minimum easily at a lower calculation cost than the conventional artificial potential method by sequentially adding a certain amount to the potential of a cell that has been determined to be a local minimum in the course of a path search. The method also enables rapid search for a movement path because it can generate a movement path by repeating a highly local comparison operation involving only eight points neighboring the current position.

Figure 7:
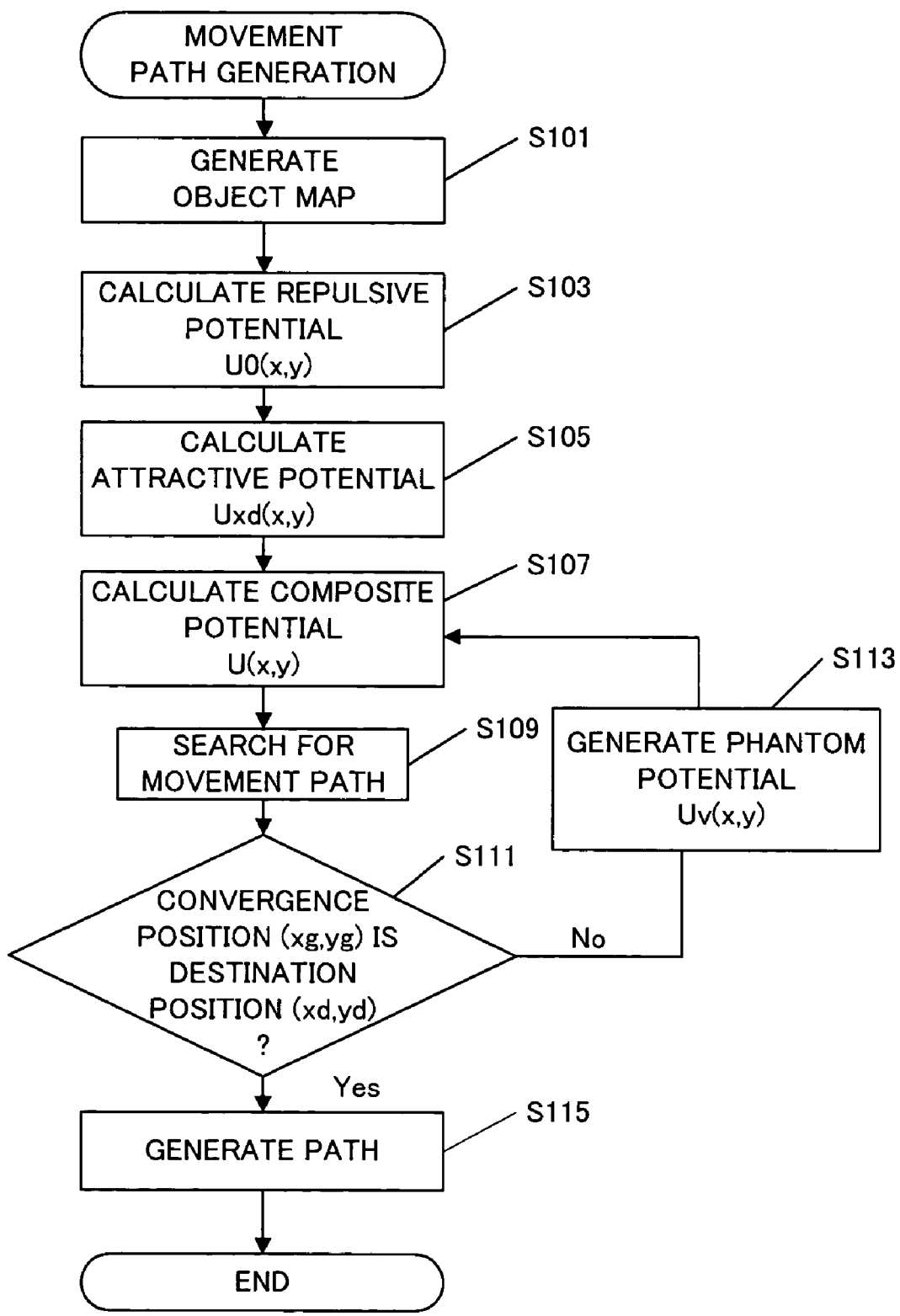
FIG. 7 is a flowchart illustrating generation of a movement path for a mobile robot according to an embodiment of the invention.

FIG. 7 is a flowchart illustrating the flow of movement path generation processing at the path generator 29.

At step S101, a map is set up based on information on the movement space 10 received from the global map 43, and an object map is generated based on tag information received from the tag information detector 27 and information on the target object 17 reflecting the task given to the mobile robot 11. The tag information includes position of the tags 19, 21 attached to each object in the movement space 10 (i.e., the mobile robot 11, target object 17, movable obstacle 13, and fixed obstacle 15) and object-specific information based on tag IDs. The coordinate of each object is determined from the position information and the shape of each object is determined from object-specific information. Then, an area covering the object with some margin is plotted on the object map.

At step S103, a repulsive potential $U_0(x,y)$ for moving the mobile robot 11 away from the obstacles 13, 15 is calculated with Formula (1). The value of the repulsive potential $U_0(x,y)$ is larger than 0 in the movement space, increases substantially infinitely as the coordinate (x,y) on the object map is closer to the obstacle 13, 15, and becomes 0 when the distance between the coordinate (x,y) and the obstacle 13, 15 is equal to or greater than a predetermined value. The repulsive potential $U_0(x,y)$ forms a potential field that moves the robot 11 away from the obstacles 13, 15.

At step S105, an attractive potential $U_{xd}(x,y)$ for bringing the mobile robot 11 close to the destination position $(x_d, y_d)$ where the target object 17 lies is calculated with Formula (3). The value of the attractive potential $U_{xd}(x,y)$ is 0 at the destination position $(x_d, y_d)$ and has a larger value as the coordinate (x,y) is farther from the destination position $(x_d, y_d)$.

At step S107, a phantom potential $U_v(x,y)$ is added to the attractive potential $U_{xd}(x,y)$ and the repulsive potential $U_0(x,y)$ to generate a composite potential $U(x,y)$. The initial value of the phantom potential $U_v(x,y)$ is 0.

At step S109, a movement path for the mobile robot 11 is searched for by utilizing the potential field in the movement space 10 formed by the composite potential $U(x,y)$. In the path search process, composite potentials $U(x,y)$ of eight points neighboring the cell of the current position of the mobile robot 11 are compared and a cell having a minimum potential is determined. If the composite potentials $U(x,y)$ of all the eight neighboring points are greater than the potential of the current position, a converge position $(x_g, y_g)$ has been met.

At step S111, it is determined whether the converge position $(x_g, y_g)$ matches the destination position $(x_d, y_d)$. If they do not match, it is determined that the path search has converged to a local minimum and the procedure proceeds to step S113. If the two positions match, it is determined that the search for a path to the destination position is accomplished and the procedure proceeds to step S115.

At step S113, a phantom potential $U_v(x,y)$ for resolving the local minimum is generated. A predetermined value is added to the phantom potential $U_v(x_g, y_g)$ of the convergence position $(x_g, y_g)$ to update the phantom potential $U_v(x,y)$. The amount by which the phantom potential $U_v(x,y)$ is increased depends on the size of the operation space or the number of obstacles and the like, and is 0.1 for example. The updated phantom potential $U_v(x,y)$ is added to the composite potential $U(x,y)$ at step S107, and a search for a movement path using the new composite potential $U(x,y)$ is again carried out.

At step S115, information on a movement path from the initial position of the mobile robot 11 to the destination position $(x_d, y_d)$ is generated. The information on the movement path is sent to the communication apparatus 31.

The generated path information is transmitted to the mobile robot 11 via the communication apparatus 31. The mobile robot 11 travels to the target object 17 according to the path information utilizing the ultrasonic tag 19 attached to itself to confirm where it is currently positioned.

The functions of the map generator 41, composite potential generator 47, local minimum determination unit 49, phantom potential generator 51, and path generator 53 of FIG. 2, which are essential parts of the invention, may be implemented by hardware or by software programs. In the case the functions are implemented by programs, the programs may be pre-stored in the path generator 29, or the programs may be externally provided as necessary on a storage medium such as a CD-ROM or by wireless/wired transmission.

While the invention has been described with respect to specific embodiment, the invention is not limited thereto. For example, values such as the cell value "1" for an object area on an object map, the attractive potential "1" for the initial position of the robot 11, and the addition of "0.1" of the phantom potential are shown as examples in accordance with the environment of the embodiment. These values may be set as appropriate based on the number of objects in the movement space 10, the computation ability of the path generator 29, a desired calculation speed and so on.

The invention claimed is:

1. A path generator for autonomously generating a movement path for a mobile object in a movement space, comprising:
   a map generator configured to generate a map of said movement space based on an initial position and a destination position of said mobile object, and the positions and shapes of one or more obstacles;
   a composite potential generator configured to calculate an attractive potential and a repulsive potential that are based on a relative positional relationship in said map of said mobile object, said obstacles and said destination position, wherein said generator is configured to generate a composite potential that is a sum of the attractive potential and the repulsive potential;
   a local minimum determination unit configured to perform a path search in said map based on said composite potential, wherein said local determination unit is configured to determine a position of a lowest composite potential in a local area of a predetermined size around said mobile object and to determine whether said position of the lowest composite potential matches said destination position, wherein
   said path generator is configured such that when said position of a lowest composite potential does not match said destination position, a potential is added to said lowest composite potential so that said mobile object may move out of said position of the lowest composite potential; and
   when said position of the lowest composite potential matches said destination position, a movement path for said mobile object is produced.

2. The path generator for a mobile object according to claim 1, further comprising:
   a tag information detector configured to receive signals from tags attached to said mobile object, said obstacles and a target object.

3. The path generator for a mobile object according to claim 2, wherein said tags include RF-ID tags attached to the target object and one or more movable obstacles and ultrasonic tags attached to said mobile object and one or more fixed obstacles.

4. The path generator for a mobile object as in any one of claims 1, 2, and 3, wherein said attractive potential is determined by a formula represented by $$U_{xd}(x, y) = \frac{1}{2} k_p \{(x - x_d)^2 + (y - y_d)^2\}$$

where $(x,y)$ is a coordinate in said map, $(x_d, y_d)$ is a coordinate of said destination position, and $k_p$ is a positive weighting factor, said repulsive potential is determined by a formula represented by $$U_0(x, y) = \begin{cases} \frac{1}{2} \eta \left( \frac{1}{p(x, y)} - \frac{1}{p_0} \right)^2 & p(x, y) \leq p_0 \\ 0 & p(x, y) > p_0 \end{cases}$$

where $\eta$ is a positive weighting factor, $p_0$ is a positive constant representing a threshold at which repulsive potential occurs, $p(x,y)$ is a smallest distance between a certain coordinate $(x,y)$ in said map and a coordinate where said obstacle lies, $p(x,y)$ is determined by a formula represented by $$p(x,y) = \min \sqrt{(x-x_m)^2 + (y-y_m)^2}$$

where $(x_m, y_m)$ represents all coordinates contained in an area of said obstacle in said map, and said composite potential is determined by a formula represented by $$U(x,y) = U_{xd}(x,y) + U_0(x, y) + U_v(x,y)$$

where $U_{xd}(x,y)$ is an attractive potential, $U_0(x,y)$ is a repulsive potential, and $U_v(x,y)$ is a potential to be added to said lowest composite potential so that said mobile object may move out of said position of the lowest composite potential.

5. A computer executable program, stored in a computer readable medium, for autonomously generating a movement path for a mobile object in a movement space, said program causing a computer to perform a process, the process comprising:
   generating a map for said movement space based on information that is stored in a memory including an initial position and a destination position of said mobile object and a position and shape of one or more obstacles;
   calculating an attractive potential and a repulsive potential in said map based on a relative positional relationship among said mobile object, said obstacles and said destination position, and generating a composite potential as a sum of the attractive potential and the repulsive potential;
   performing a path search in said map based on said composite potential, determining a position of a lowest composite potential in a local area of a predetermined size around said mobile object, and determining whether said position of the lowest composite potential matches said destination position;

adding a potential to said lowest composite potential so that said mobile object may move out of said position of the lowest composite potential when said position of the lowest composite potential does not match said destination position; and producing a movement path for said mobile object when said position of the lowest composite potential matches said destination position.

6. The program according to claim 5, further causing the computer to identify information from signals from tags attached to said mobile object, said obstacle and a target object at said destination position.

7. The program according to claim 6, wherein said tags include RF-ID tags attached to said target object and movable obstacle and ultrasonic tags attached to said mobile object and one or more fixed obstacles.

8. The program as in any one of claims 5, 6, and 7, wherein said attractive potential is determined by a formula represented by $$U_{xd}(x, y) = \frac{1}{2}k_p\{(x-x_d)^2 + (y-y_d)^2\}$$

where (x,y) is a certain coordinate in said map, $(x_d, y_d)$ is a coordinate of said destination position, and $k_p$ is a positive weighting factor, said repulsive potential is determined by a formula represented by $$U_0(x, y) = \begin{cases} \frac{1}{2}\eta\left(\frac{1}{p(x, y)} - \frac{1}{p_0}\right)^2 & p(x, y) \le p_0 \\ 0 & p(x, y) > p_0 \end{cases}$$

where $\eta$ is a positive weighting factor, $p_0$ is a positive constant and is a threshold at which repulsive potential occurs, p(x,y) is the smallest distance between a certain coordinate (x,y) in said map and a coordinate at which said obstacle is recognized to exist, p(x,y) is determined by a formula represented by $$p(x,y) = \min\sqrt{(x-x_m)^2 + (y-y_m)^2}$$

where $(x_m, y_m)$ represents all coordinates contained in an area of said obstacle in said map, and said composite potential is determined by a formula represented by $$U(x,y) = U_{xd}(x,y) + U_0(x,y) + U_v(x,y)$$

where $U_{xd}(x,y)$ is an attractive potential, $U_0(x,y)$ is a repulsive potential, and $U_v(x,y)$ is a potential to be added to said lowest composite potential so that said mobile object may move out of said position of the lowest composite potential.

* * * * *

UNITED STATES PATENT AND TRADEMARK OFFICE
CERTIFICATE OF CORRECTION

| | | |
|---|---|---|
| PATENT NO. | : 7,519,457 B2 | |
| APPLICATION NO. | : 11/452270 | |
| DATED | : April 14, 2009 | |
| INVENTOR(S) | : Yuji Hasegawa et al. | |

It is certified that error appears in the above-identified patent and that said Letters Patent is hereby corrected as shown below:

Title Page, Item [73] Assignee should read

--(73)  Assignee: Honda Motor Co., Ltd.--.

Signed and Sealed this
Fourth Day of January, 2011

David J. Kappos
*Director of the United States Patent and Trademark Office*